United States Patent [19]

Karakama

[11] Patent Number: 5,600,759
[45] Date of Patent: Feb. 4, 1997

[54] ROBOT CAPABLE OF GENERATING PATTERNS OF MOVEMENT PATH

[75] Inventor: Tatsuo Karakama, Yamanashi, Japan

[73] Assignee: FANUC Ltd., Japan

[21] Appl. No.: 270,216

[22] Filed: Jul. 1, 1994

Related U.S. Application Data

[63] Continuation of Ser. No. 965,052, Oct. 22, 1992, abandoned, which is a continuation of Ser. No. 601,784, Nov. 2, 1990, abandoned.

[30] Foreign Application Priority Data

Mar. 20, 1989 [JP] Japan .................................. 1-65916

[51] Int. Cl.⁶ .................................. B25J 9/16; B25J 9/22; G05B 13/00
[52] U.S. Cl. .................................. 395/87; 395/80; 395/81; 395/86; 395/89; 395/82; 395/97; 395/99; 318/568.13; 901/3
[58] Field of Search .................................. 395/80, 81, 86, 395/87, 89, 82, 97, 99; 318/568.13; 901/3

[56] References Cited

U.S. PATENT DOCUMENTS

| | | | |
|---|---|---|---|
| 4,150,329 | 4/1979 | Dahlstrom | 395/80 |
| 4,152,765 | 5/1979 | Weber | 364/474.25 |
| 4,328,550 | 5/1982 | Weber | 364/474.25 |
| 4,420,812 | 12/1983 | Ito et al. | 364/513 |
| 4,538,233 | 8/1985 | Resnick et al. | 395/87 |
| 4,550,383 | 10/1985 | Sugimoto | 395/84 |
| 4,635,206 | 1/1987 | Bhatia et al. | 395/80 |
| 4,672,551 | 6/1987 | Ookuma et al. | 364/474.33 |
| 4,698,573 | 10/1987 | Niwa | 364/474.33 |
| 4,700,118 | 10/1987 | Kishi et al. | 395/86 |
| 4,739,489 | 4/1988 | Kishi et al. | 364/474.33 |
| 4,743,819 | 5/1988 | Hashizume | 395/87 |
| 4,835,730 | 3/1989 | Shimano et al. | 364/513 |
| 4,886,529 | 12/1989 | Hashimoto et al. | 901/16 |
| 4,942,539 | 7/1990 | McGee et al. | 395/88 |
| 4,965,499 | 10/1990 | Taft et al. | 395/94 |
| 4,967,125 | 10/1990 | Hara | 364/513 |
| 4,967,127 | 10/1990 | Ishiguro et al. | 364/474.03 |
| 4,998,050 | 3/1991 | Nishiyama et al. | 395/84 |
| 5,057,995 | 10/1991 | Mizuno et al. | 395/80 |
| 5,171,966 | 12/1992 | Fukuoka et al. | 219/125.12 |
| 5,191,639 | 3/1993 | Hara | 395/86 |

FOREIGN PATENT DOCUMENTS

| | | |
|---|---|---|
| 0266424 | 5/1988 | European Pat. Off. . |
| 56-98594 | 8/1981 | Japan . |
| 60-49867 | 3/1985 | Japan . |
| 61-60275 | 3/1986 | Japan . |
| 62-93710 | 4/1987 | Japan . |

*Primary Examiner*—George B. Davis
*Attorney, Agent, or Firm*—Staas & Halsey

[57] ABSTRACT

A robot which is capable of automatically generating movement path patterns based on taught data and in which a data teaching operation associated with pattern generation is simplified and no special data teaching is required even when the pitch between pattern segments is to be changed. During a manual robot operation, when start and end points (P0, Pn) of a spraying pattern which consists of a series of subpatterns, and a first cornering point (P1) of a first subpattern are taught to the robot, taught data representing these three point is stored in a robot control unit, together with a spraying command code and a spraying pitch (d) taught separately. During a playback robot operation, in response to the spraying command code, a vector (A) directed from the start point (P0) to the first cornering point (P1) and a vector (D) directed from the first cornering point (P1) to a second cornering point (P2) are calculated based on the taught data and the pitch. Each time a plasma jet torch reaches one of the start point, first to third cornering points and end point of a subpattern, the end point of a corresponding one of the vector (A), the vector (B), and a vector derived by reversing the vector (A), all having a start point thereof coinciding with the reached point, is determined as a new target position, thereby generating a spraying pattern.

19 Claims, 4 Drawing Sheets

ROBOT CAPABLE OF GENERATING PATTERNS OF MOVEMENT PATH

This application is a continuation of application Ser. No. 07/965,052, filed Oct. 22, 1992, now abandoned, which is a continuation of application Ser. No. 07/601,784, filed Nov. 2, 1990, now abandoned.

TECHNICAL FIELD

The present invention relates to a robot which is capable of automatically generating patterns of movement path based on previously taught data, and more particularly, to a robot in which a data teaching operation for pattern generation is simplified, so that no special or additional data teaching is required even when the pitch between pattern segments is to be changed.

BACKGROUND ART

Thermal spraying robots are conventionally known in which movement path patterns for a plasma jet torch consisting of a series of identical subpatterns are generated based on taught data and the torch is moved in a plane in accordance with the generated patterns.

In thermal spraying robots, before spraying is carried out, an operator teaches the robot start and end points of a first subpattern, individual cornering points between the start and end points, and a subpattern shift amount (consisting, for example, of the component of a shifting direction and the component of a direction perpendicular to the shifting direction). When taught individual points, the robot stores, in a pattern file, joint angles (taught data) of individual robot axes for positioning the torch at the respective taught points. Also, when the subpattern shift amount is taught, it is stored in the file.

In a spraying operation, the robot first carries out spraying on tile first portion of a spraying plane in accordance with the first subpattern generated based on the taught data read from the pattern file. Subsequently, in accordance with the next subpattern generated by adding the shift amount to the individual points of the first subpattern, the robot effects spraying on a portion of the plane adjacent to the already sprayed portion. Thereafter, a similar operation is repeated in accordance with the subpatterns successively generated, to complete a spraying operation over the entire spraying plane.

In the conventional robot mentioned above, when the distance (pitch) between adjacent ones of pattern segments constituting a subpattern and extending perpendicularly to the direction of pattern shifting is to be varied, the start point, individual cornering points, and end point of the subpattern and the subpattern shift amount must be taught again. This requires much effort and additional teaching. Particularly, when a high pattern generation accuracy is required, the teaching process must be executed carefully and thus the teaching process becomes quite time consuming.

DISCLOSURE OF THE INVENTION

An object of the present invention is to provide a robot which is capable of automatically generating patterns of movement path based on previously taught data, in which a data teaching operation associated with pattern generation is simplified and no special data teaching is required even when the pitch between pattern segments is to be changed.

To achieve the above object, the robot according to the present invention comprises teaching means for previously teaching a start point, an end point and one cornering point of a movement path pattern and a pitch between pattern segments, storing means for storing taught data respectively corresponding to the start point, end point, and one cornering point of the movement path pattern and the pitch thus taught, and pattern generating means for automatically generating a movement path pattern based on the taught data.

As described above, according to the present invention, a movement path pattern is automatically generated based on the taught data corresponding to the start point, end point and one cornering point of the movement path pattern and the pitch between the pattern segments which are all previously taught. Accordingly, only a simple teaching operation, namely, teaching the above three points of the movement path pattern and the pattern pitch, is needed before an actual operation of the robot can take place. Moreover, when the pattern pitch is to be changed, a new pitch has only to be taught and it is unnecessary to teach the respective points of the pattern again.

BEST MODE OF CARRYING OUT THE INVENTION

Figure 1:
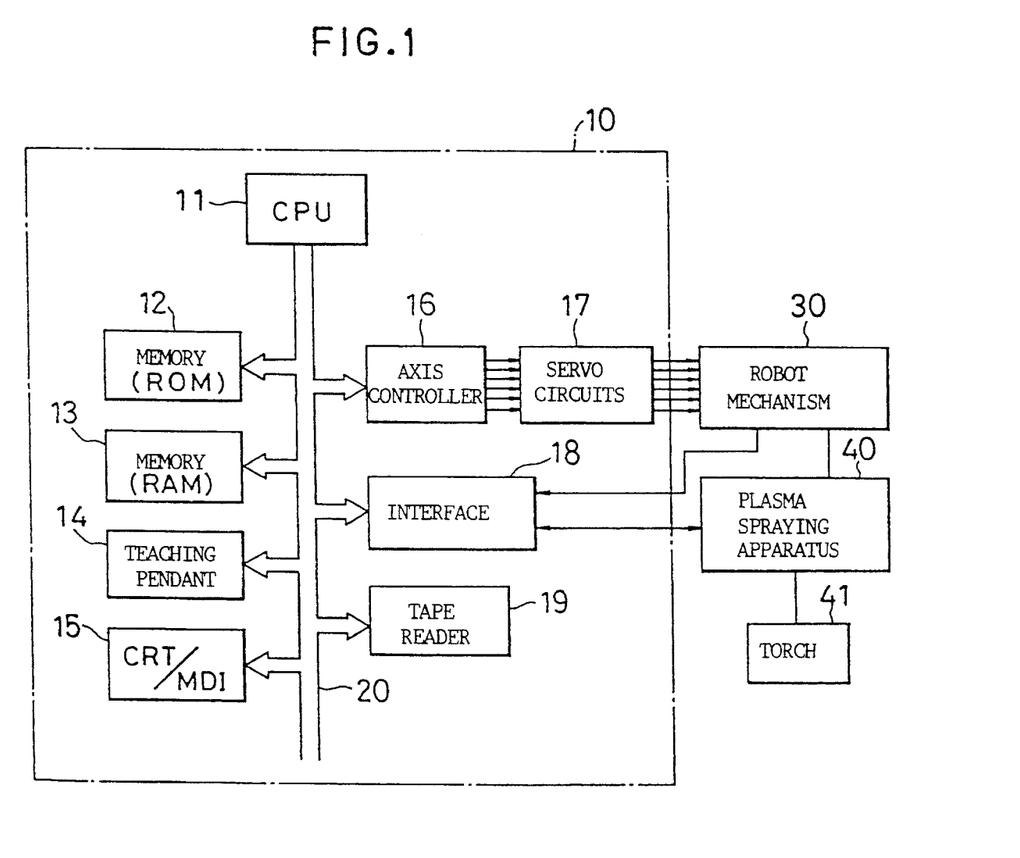
FIG. 1 is a schematic block diagram showing a principal part of a spraying robot according to one embodiment of the present invention.

Referring to FIG. 1, a thermal spraying robot in an embodiment of the present invention comprises a robot control unit 10, a robot mechanism 30 including servomotors (not shown) for individual axes and sensors (not shown) for detecting rotational angles (joint angles) of the motors of the individual axes, and a plasma spraying apparatus 40 having a plasma jet torch 41. The thermal spraying robot, and is arranged to control the position and orientation of the torch by the servomotors for the individual axes driven by the control unit 10, so as to perform plasma spraying on a flat surface of a workpiece (not shown) such as various component parts.

Specifically, the control unit 10 comprises a central processing unit (CPU) 11, a read-only memory (ROM) 12 storing various control programs executed by the CPU 11, and a random-access memory (RAM) 13. The control unit 10 further comprises a teaching pendant 14 having a numerical display unit, lamps, operating buttons, etc., a CRT and manual data input unit (CRT/MDI) 15 having a CRT display unit and various keys including character/number keys, cursor keys, function keys, etc., an axis controller 16 including an interpolator, and servo circuits 17 connected to the axis controller. Reference numeral 18 denotes an interface between the control unit 10 and the robot mechanism 30 and between the control unit 10 and the plasma spraying apparatus 40, and 20 denotes busses connecting the abovementioned elements 12 to 16, 18 and 19 to the CPU 11.

The CPU 11 is arranged to read joint angles (taught data) of the individual axes of the robot mechanism 30 each time an operator executes a registering operation with the plasma jet torch 41 positioned at each of the teaching points in a required orientation during manual operation of the robot, by operating the teaching pendant 14 and/or the CRT/MDI 15. Further, the CPU 11 is operable to read various instruction codes and data which are input by the operator through the pendant 14 and/or the CRT/MDI 15. Moreover, a teaching program is prepared by the CPU 11 based on the taught data, instruction codes, etc., and the created program is stored in the RAM 13. The control unit 10 has a tape reader 19, and an operation program created by the operator on an off-line basis and input through the tape reader 19 is stored in the RAM 13.

Figure 2:
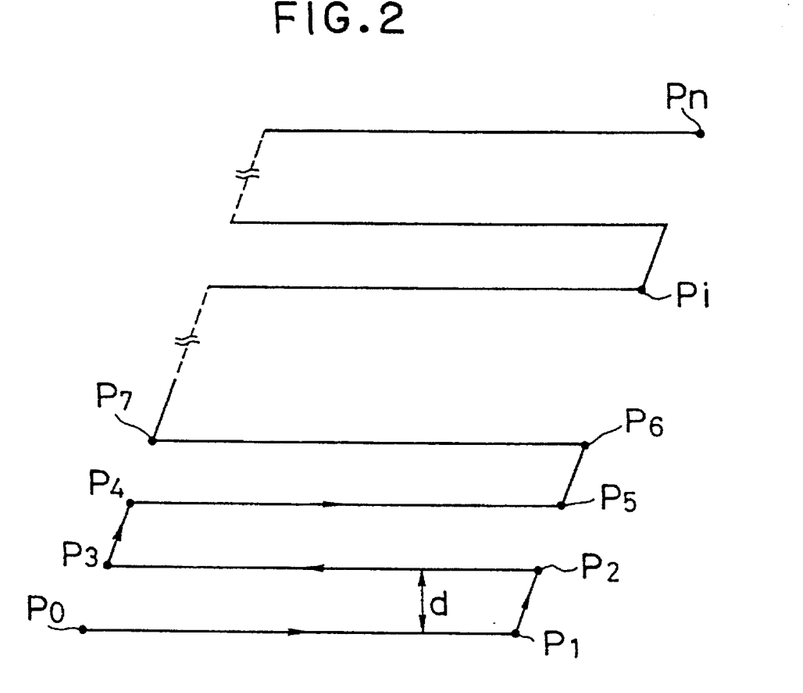
FIG. 2 is a schematic diagram showing a spraying pattern.

The operation of the robot in FIG. 1 will be now described with reference to FIGS. 2 to 4.

Prior to a playback operation of the robot, the operator teaches the robot a movement path pattern (spraying pattern) of the torch on a plane of a workpiece, during manual operation of the robot. The spraying pattern, shown in FIG. 2 by way of example, consists of a series of subpatterns, and is, as a whole, in the form of a comb. The subpatterns are identical with each other and each consist of four pattern segments individually connecting adjacent ones of a start point, three cornering points, and an end point. The last subpattern, however, consists of the first segment alone. In FIG. 2, symbols P0 and Pn denote the spraying start point and spraying end point, respectively, and P0 to P4 respectively denote the start point, first to third cornering points, and end point of the first subpattern. Symbols P4 to P7 denote the start point, and first to third cornering points of the second subpattern, respectively, and Pi generally represents the start point, cornering point or end point (in FIG. 2, cornering point) of a subpattern. Symbol d represents the spraying pitch, i.e., the distance between adjacent ones of (e.g., between the first segment P0P1 and third segment P2P3 of the first subpattern) parallel pattern segments extending horizontally in FIG. 2.

More specifically, to teach the spraying pattern, the operator first positions the plasma jet torch 41 in a required orientation at the spraying start point P0 on the workpiece plane, while manually operating the robot, and teaches the robot the position and orientation of the torch assumed at that time. The CPU 11 reads the joint angles (taught data) of the individual axes which are detected by the various sensors of the robot mechanism 30 and which correspond to the position and orientation of the torch at the point P0, and causes the data to be stored in the RAM 13. Subsequently, when the operator inputs a spraying command code, the CPU 11 causes the code to be stored in the RAM 13 in association with the spraying start point P0. Then, the operator teaches the position and orientation of the torch at the first cornering point P1 of the first subpattern, and the CPU 11 causes data, representing the joint angles of the individual axes corresponding to the torch position and orientation at the point P1, to be stored in the RAM 13. Next, when the operator inputs a value of the spraying pitch d, the same value is stored in the RAM 13. When the spraying end point Pn is taught, the joint angles of the individual axes at that time are stored in the RAM 13. Finally, the operator inputs a number m of times by which the spraying operation for the same workpiece plane is to be repeated in accordance with the spraying pattern, and the CPU 11 causes this target repetitions m of spraying to be stored in the RAM 13.

When necessary, an additional teaching operation is executed to input other various teaching data and various instruction codes. On the basis of the spraying pattern etc. taught in the above manner, the CPU 11 creates a required teaching program and causes this teaching program to be stored in the RAM 13.

Figure 3A:
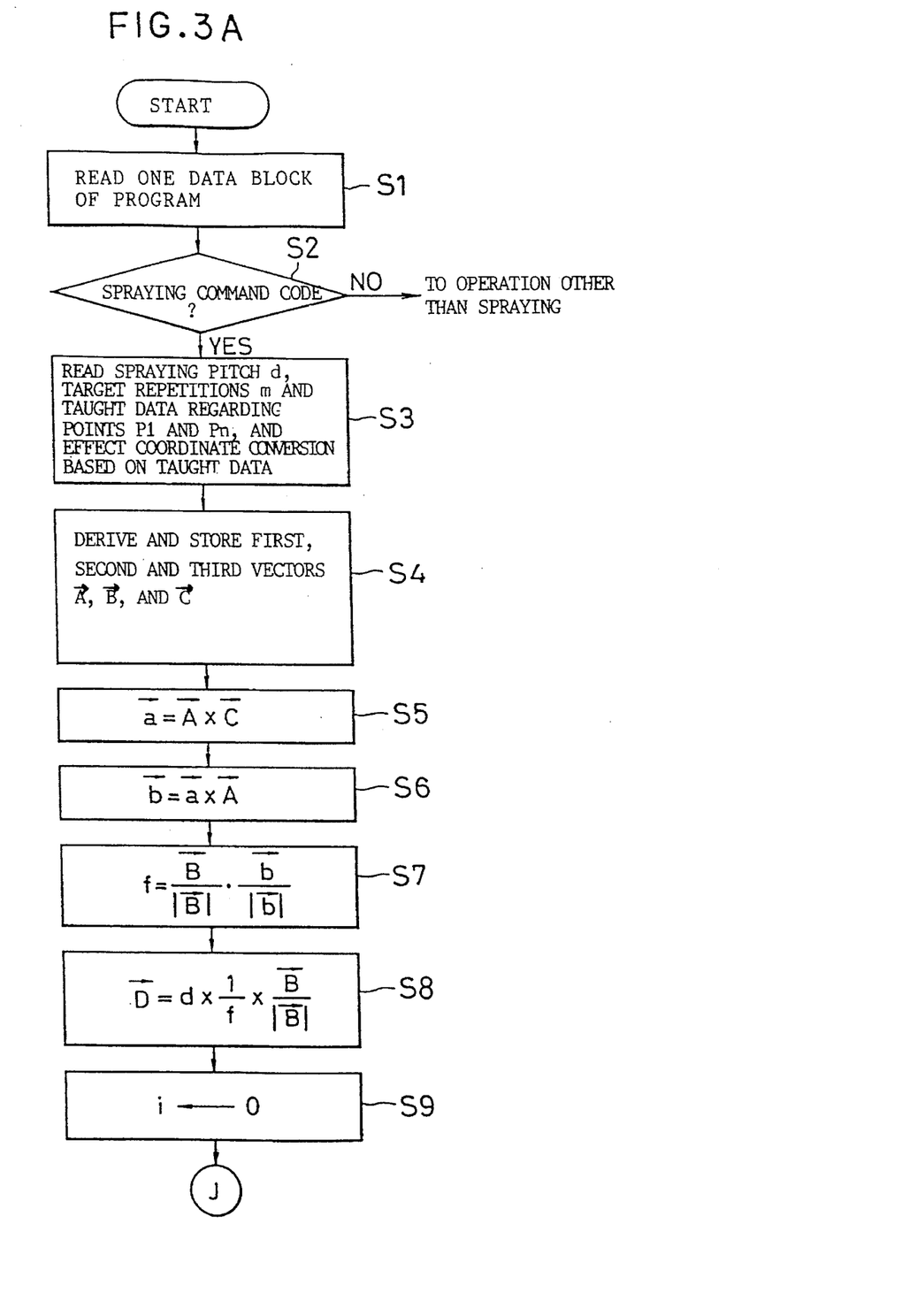
FIG. 3A is a flowchart showing part of a spraying operation program executed by a robot control unit in FIG. 1.
Figure 3B:
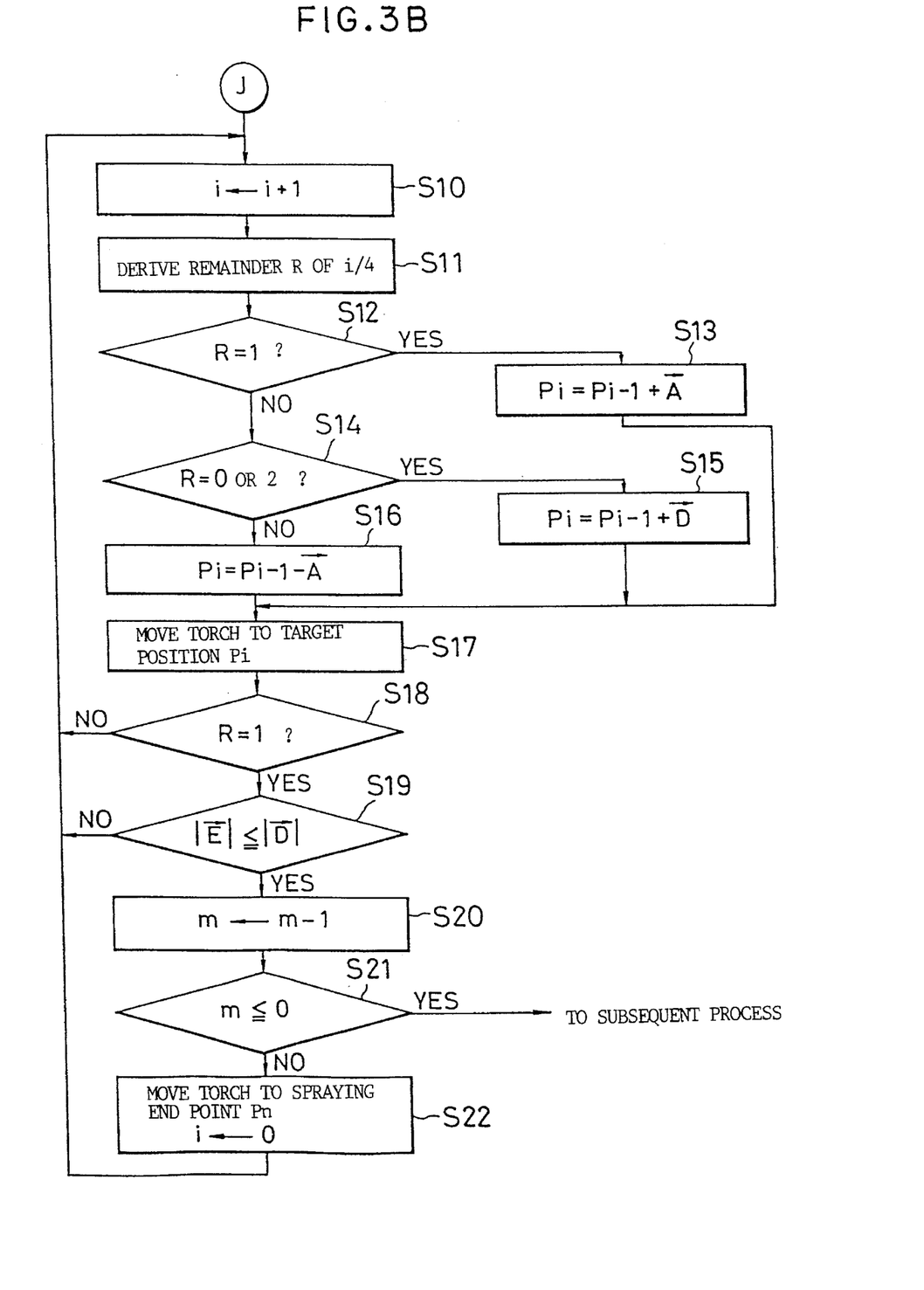
FIG. 3B a flowchart showing the remaining part of the spraying operation program.

During a playback operation of the robot, the CPU 11 reads out the teaching program one data block by one data block from the RAM 13 and successively executes these data blocks, the aforesaid program including a program for effecting a spraying operation including a spraying pattern generating process (FIG. 3).

Specifically, in the playback operation of the robot, the CPU 11 reads out one data block of the teaching program (step S1 in FIG. 3), and determines whether or not this data block includes the spraying command code (step S2). If no spraying command code is included, a required operation (this operation does not relate to the present invention and hence an explanation thereof will be omitted) other than the spraying is carried out.

If it is determined in step S2 that the spraying command code is included, the CPU 11 reads out the spraying pitch d and the target repetitions m of spraying from the RAM 13, and stores the same in corresponding registers accommodated in the CPU. The CPU 11 further reads out the joint angles of the individual axes corresponding to the torch position at the start of the spraying operation (spraying start position P0), from corresponding registers accommodated therein, and reads out two sets of joint angles of the individual axes corresponding respectively to the first cornering point P1 of the first subpattern and the spraying end point Pn, both previously taught, from the RAM 13. Then, the CPU successively converts these three sets of joint angles corresponding to the points P0, P1 and Pn into respective directional components along X, Y and Z axes of an orthogonal coordinate system by a coordinate conversion process, the results of the conversion being stored in the corresponding registers in the CPU (step S3).

Figure 4:
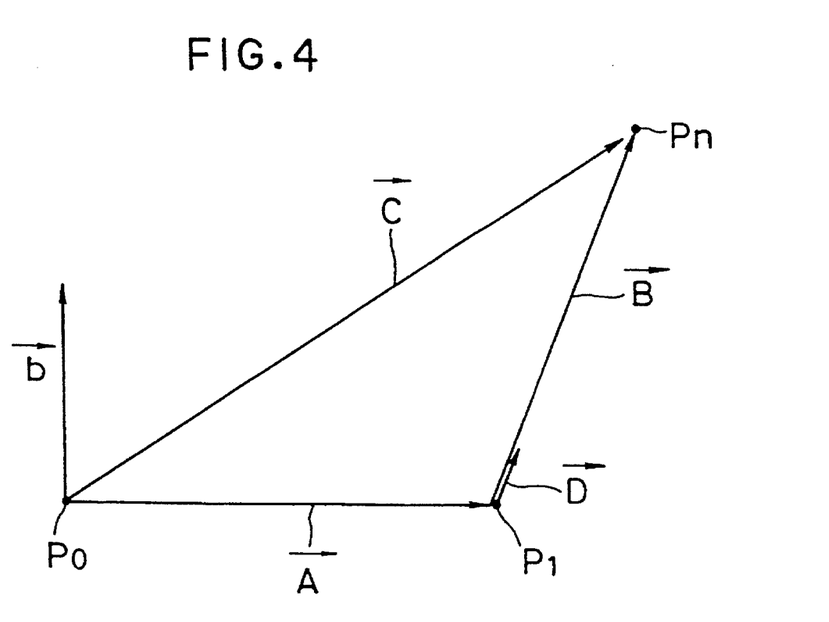
FIG. 4, is a vector diagram showing various vectors used in a spraying pattern generating process.

Next, the CPU 11 calculates as position data first to third vectors A, B and C, shown in FIG. 4, based on the X-, Y-, and Z-axis directional components of the three points P0, P1 and Pn, respectively, and causes the derived data to be stored in corresponding registers (step S4). The start and end points of the first vector A coincide with the points P0 and P1, respectively, the start and end points of the second vector B coincide with the points P1 and Pn, respectively, and the start and end points of the third vector C coincide with the points P0 and Pn, respectively. In this specification, various vectors including the first to third vectors are denoted by bold-faced symbols.

The CPU 11 then derives an outer product vector a of the first and third vectors A and C, an outer product vector b of the outer product vector a and the vector A, and an inner product f of the unit vector of the second vector B and the outer product vector b (steps S5–S7). The outer product vector a (not shown) represented by the following equation (1), which is a normal vector associated with the plane (workpiece surface) passing the three points P0, P1 and Pn, is perpendicular at the point P0 in FIG. 4 to the drawing paper and directed from the rear side to the front side of the paper. The outer product vector b represented by the following equation (2) is parallel to the workpiece surface and perpendicular to the first vector A. The inner product f represented by the following (3) indicates the cosine of the angle between the second vector B and the outer product vector b.

$$a = A \times C \quad (1)$$

$$b = a \times A \quad (2)$$

$$f = \frac{B}{|B|} \cdot \frac{b}{|b|} \quad (3)$$

Next, on the basis of the spraying pitch d, the inner product f and the second vector B, the CPU 11 derives as pitch data a fourth vector (pitch vector) D represented by the following equation (4), and having start and end points respectively coinciding with the first and second cornering points P1 and P2 of the first subpattern (step S8).

$$D = d \times \frac{1}{f} \times \frac{B}{|B|} \quad (4)$$

Then, after setting an index i to "0" in step S9, the CPU 11 updates the value of the index i to "1" (generally, to "i+1") (step S10), and divides the updated value of the index i by "4", to obtain a remainder R (step S11). At the start of a spraying operation, the CPU 11 determines that the remainder R is "1" (step S12), and adds the first vector A to the current torch position P0 to determine the target position P1 (step S13). Generally, in step S13, the first vector A is added to the current torch position (previous target position) Pi−1, thereby determining the target position P1 represented by the following equation (5).

$$Pi = Pi-1 + A \quad (5)$$

Then, to move the plasma Jet torch 41 of the plasma spraying apparatus 40 from the current position Pi−1 (here, P0) to the target position Pi (here, P1), the CPU 11 distributes pulses to the servo circuits 17 of the individual axes through the axis controller 16 (step S17). Accordingly, the servomotors of the individual axes of the robot mechanism 30 are driven, and thus the torch is moved from the current position Pi−1 toward the target position Pi. While the torch is moved, the CPU 11 drives the plasma spraying apparatus 40 through the interface 18, whereby plasma spraying is performed on the surface portion of the workpiece from the point Pi−1 to the point Pi. Here, a plasma spraying is performed along the first segment P0P1 of the first subpattern.

In the next step S18, the CPU 11 determines whether or not the remainder R is "1". Since the result of the determination in step S18 immediately after the start of the spraying operation is affirmative (YES), the CPU 11 calculates the magnitude of a fifth vector E (not shown) having a start point thereof at the point P1 and an end point thereof at the point Pi, based on the first cornering point P1 of the first subpattern and the target position Pi, and then determines whether the magnitude |E| of the fifth vector is equal to or smaller than the magnitude of the second vector B, namely, whether or not the spraying end point Pn has been reached (step S19).

Immediately after the spraying is started, the target position Pi is identical with the first cornering point P1 (E=D), and thus the result of the determination in step S19 is negative (NO). Accordingly, the flow returns to the aforesaid step S10 and the value of the index i (=1) is updated to "i+1 (=2)". As a result, the remainder R obtained in step S11 is "2", and the result of the determination in step S12 becomes negative. The CPU 11 then determines in step S14 whether the remainder R is "0" or "2". Here, since the result of the determination in step S14 is affirmative, the pitch vector D is added to the current torch position P1 (generally, Pi−1), to obtain the target position P2 based on the desired path pitch (generally, Pi represented by the following equation (6)) (step S15).

$$Pi = Pi-1 - D \quad (6)$$

Then, in the step S17, plasma spraying is performed from the point P1 to P2 along the second segment. Since the result of the determination in the following step S18 is negative, the flow returns to step S10.

In this case, the remainder R is "3", and the results of the determinations in steps S12 and S14 following steps S10 and S11 are both negative, and hence, the target position P3 (generally, Pi represented by the following equation (7)) is obtained by subtracting the first vector A from the current torch position P2 (generally, Pi−1) (step S16).

$$Pi = Pi-1 - A \quad (7)$$

Then, in the step S17, plasma spraying is effected from the point P2 to P3 along the third segment. Since the result of the determination in the following step S18 is negative, the flow returns to step S10.

In this case, the remainder R is "0", and the result of the determination in step S12 following steps S10 and S11 is affirmative. Accordingly, the target position P4 is derived in the step S15, and plasma spraying is carried out from the point P3 to the point P4 along the fourth segment in step S17. In this way, first plasma spraying from the start point P0 to end point P4 of the first subpattern is completed.

In the following step S18, the result of the determination is negative, and thus the flow returns to step S10. Thus, a first plasma spraying is carried out along the first to fourth segments of the second subpattern.

In a similar manner, first plasma spraying is performed successively on the respective subpatterns. When, in step S19 immediately after the completion of first plasma spraying along the first segment of the last subpattern, it is determined that the magnitude |E| of the fifth vector is equal to the magnitude |B| of the second vector, (namely, the torch has reached the spraying end point Pn), the CPU 11 decrements the register value representing the target number of times the spraying operation, from "m" to "m−1" (step S20). The CPU 11 then determines whether the new register value m (=m−1) is equal to or smaller than "0", (namely, whether or not the plasma spraying along the spraying pattern has been carried out the target number of times m) (step S21). If the result of the determination is negative, the CPU 11 carries out pulse distribution in step S22, to move the plasma jet torch 41 from the spraying end point Pn to the spraying start point P0, and resets the index i to "0". At this time, the step S10 is executed.

When the plasma spraying along the spraying pattern from the spraying start point P0 to the spraying end point Pn is repeated the target number of times m, the result of the determination at step 21 and immediately after that time becomes affirmative. In this case, the CPU 11 proceeds to a process (this process does not relate to the present invention, and hence an explanation thereof will be omitted) subsequent to the spraying process of FIG. 3.

The present invention is not limited to the above-described embodiment alone, and various modifications thereof may be made.

For example, although in the above embodiment, the invention is applied to a thermal spraying robot, it can be applied to various types of robots which are designed to work in a plane along a movement path pattern composed of a combination of segments extending in a first direction and segments extending in a second direction.

Further, in the foregoing embodiment, the teaching data (the spraying start point P0, the cornering point P1, the spraying end point Pn, and the spraying pitch d) is taught during a manual operation of the robot. Alternatively, the teaching data may be stated, by using a programming language, in a program which is prepared offline.

I claim:

1. A robot for automatically generating a movement path pattern based on previously taught data, comprising:

first teaching means for teaching only a portion of a plurality of points in a sub-pattern of a movement path pattern, said portion of said plurality of points including a start point, an end point, and one cornering point, said movement path pattern including a plurality of segments each connected to each other to form said movement path pattern;

first storing means for storing said taught start point, end point, and one cornering point as taught data;

second teaching means for teaching a pitch between adjacent and parallel segments of said plurality of segments;

second storing means for storing said taught pitch; and pattern generating means for automatically generating said movement path pattern based on said stored taught data and said stored taught pitch.

2. A robot according to claim 1, wherein said second teaching means is operable to input a numerical value of the pitch between the segments.

3. A robot according to claim 2, wherein said robot includes a thermal spraying robot having a plasma jet torch.

4. A robot according to claim 1, wherein said robot includes a tool driven along the movement path pattern, wherein the movement path pattern comprises a series of identical subpatterns, each of the subpatterns including a first segment connecting a subpattern start point and a first subpattern cornering point, a second segment connecting the first subpattern cornering point and a second subpattern cornering point, a third segment extending parallel to the first segment and connecting the second subpattern cornering point and a third subpattern cornering point, and a fourth segment extending parallel to the second segment and connecting the third subpattern cornering point and a subpattern end point, and wherein said pattern generating means is operable to calculate first and second vectors corresponding respectively to the first and second segments of each of the subpatterns in dependence upon the taught data stored in said first storing means, and is operable to determine a new target position of the tool using a corresponding one of the first and second vectors when the tool reaches a target position corresponding to one of the subpattern start point and the first to third subpattern cornering points of one of the subpatterns.

5. A robot according to claim 4, wherein said pattern generating means is operable to determine a first vector end point, as the new target position, of the first vector having a first vector start point coinciding with one of the subpattern start and end points of one of the subpatterns when the tool reaches one of the subpattern start and ends points, wherein said pattern generating means is operable to determine a second vector end point, as the new target position, of the second vector having a second vector start point coinciding with one of the first and third subpattern cornering points of the one of the subpatterns when the tool reaches one of the first and third subpattern cornering points, and wherein said pattern generating means is operable to determine a derived vector end point, as the target position, of a vector derived by reversing the first vector and having a derived vector start point coinciding with the second subpattern cornering point of one of the subpatterns when the tool reaches the second subpattern cornering point.

6. A robot according to claim 5, wherein said pattern generating means is operable to calculate, on the basis of the taught data, a first fundamental vector having a fundamental vector start point coinciding with the start point of the movement path pattern and a first fundamental vector end point coinciding with the first subpattern cornering point of a first subpattern of the movement path pattern, a second fundamental vector having a second fundamental vector start point coinciding with a first subpattern cornering point and a second fundamental vector end point coinciding with the end point of the movement path pattern, and a third fundamental vector having a third fundamental vector start point coinciding with the start point of the movement path pattern and a third fundamental vector end point coinciding with the end point of the movement path pattern, wherein said pattern generating means is operable to calculate a first unit vector whose direction is the same as that of an outer product vector of the first fundamental vector and an outer product vector of the first fundamental vector and the third fundamental vector, and a second unit vector whose direction is the same as that of the second fundamental vector, and wherein said pattern generating means is operable to calculate the second vector by multiplication of a reciprocal of an inner product of the first and second unit vectors, the pitch, and the second unit vector.

7. A robot according to claim 5, wherein said robot includes a thermal spraying robot having a plasma jet torch.

8. A robot according to claim 5, wherein said robot includes a thermal spraying robot having a plasma jet torch.

9. A robot according to claim 4, wherein said robot includes a thermal spraying robot having a plasma jet torch.

10. A robot according to claim 1, wherein said robot includes a thermal spraying robot having a plasma jet torch.

11. A method for a robot to automatically generate a movement path pattern based on previously taught data, comprising the steps of:

(a) teaching only a portion of a plurality of points in a sub-pattern of a movement path pattern, said portion of said plurality of points including a start point, an end point, and one cornering point, said movement path pattern including a plurality of segments each connected to each other to form said movement path pattern;

(b) storing said taught start point, end point, and one cornering point as taught data;

(c) teaching a pitch between adjacent and parallel segments of said plurality of segments;

(d) storing said taught pitch; and (e) automatically generating said movement path pattern based on said stored taught data and said stored taught pitch.

12. A method according to claim 11, wherein step c includes the step (f) of receiving as input a numerical value of the pitch between the segments.

13. A method according to claim 11, further comprising the step (g) of driving a tool along the movement path pattern.

14. A method according to claim 13, wherein step (g) includes the substeps of:

(1) calculation of first and second vectors corresponding respectively to a first and a second of the plurality of segments in dependence upon the taught data; and (2) determining a target position of the tool using a corresponding one of the first and second vectors when the tool reaches one of the subpattern start point and the first to third subpattern cornering points of one of the subpatterns, and wherein the movement path pattern includes a series of identical subpatterns, each of the subpatterns including a first segment connecting a subpattern start point and a first subpattern cornering point, a second segment connecting the first subpattern cornering point and a second subpattern cornering point, a third segment extending parallel to the first segment and connecting the second subpattern cornering point and a third subpattern cornering point, and a fourth segment extending parallel to the second segment and connecting the third subpattern cornering point and a subpattern end point.

15. A method according to claim 14, wherein step (g) further includes the substeps of:

(3) determining a first vector end point, as a target position of the tool, of the first vector having a first vector start point coinciding with one of the subpattern start and end points of one of the subpatterns;

(4) determining a second vector end point, as a target position of the tool, of the second vector having a second vector start point coinciding with one of the first and third subpattern cornering points; and (5) determining a derived vector end point, as a target position of the tool, of a vector derived by reversing the first vector and having a derived vector start point coinciding with the second subpattern cornering point.

16. A method according to claim 15, wherein step (g) further includes the substeps of:

(6) calculating, in dependence upon the taught data, a first fundamental vector having a first fundamental vector start point coinciding with the start point of the movement path pattern and a first fundamental vector end point coinciding with a first subpattern cornering point of a first subpattern of the movement path pattern, a second fundamental vector having a second fundamental vector start point coinciding with a first subpattern cornering point and a second fundamental vector end point coinciding with the end point of the movement path pattern, and a third fundamental vector having a third fundamental vector start point coinciding with the start point of the movement path pattern and a third fundamental vector end point coinciding with the end point of the movement path pattern;

(7) calculating a first unit vector whose direction is the same as that of an outer product vector of the first fundamental vector and an outer product vector of the first fundamental vector and the third fundamental vector, and a second unit vector whose direction is the same as that of the second fundamental vector; and (8) calculating the second vector corresponding to the second segment by multiplication of a reciprocal of an inner product of the first and second unit vectors, the pitch, and the second unit vector.

17. A method according to claim 11, further comprising the step (h) of spraying a workpiece along the movement path pattern.

18. A method according to claim 17, wherein the step (i) includes the step (i) of spraying the workpiece with a plasma jet torch.

19. A robot for automatically generating a movement path pattern based on previously taught data, comprising:

first teaching means for teaching only a portion of a plurality of points in a sub-pattern of a movement path pattern, said portion of said plurality of points including a start point, an end point, and one cornering point, said movement path pattern including a plurality of segments each connected to each other to form said movement path pattern;

first storing means for storing said taught start point, end point, and one cornering point as taught data;

second teaching means for teaching a pitch between segments of said plurality of segments;

second storing means for storing said taught pitch; and pattern generating means for automatically generating said movement path pattern based on said stored taught data and said stored taught pitch.

* * * * *

UNITED STATES PATENT AND TRADEMARK OFFICE
CERTIFICATE OF CORRECTION

PATENT NO. :    5,600,759
DATED      :    February 4, 1997
INVENTOR(S):    Tatsuo KARAKAMA It is certified that error appears in the above-indentified patent and that said Letters Patent is hereby corrected as shown below:

<u>Column 1</u>

Line 31, "When taught individual points," should be --When taught these individual points,--;

Line 37, "tile" should be --the--.

<u>Column 2</u>

Line 32, "FIG. 3B a" should be --FIG 3B is a--;

Lines 46 and 47, "robot, and" should be --robot--.

<u>Column 3</u>

Line 20, "workpiece," should be --workpiece--;

Line 35, "Symbol d" should be --Symbol $\underline{d}$--;

Line 57, "pitch d," should be --pitch $\underline{d}$,--;

Line 61, "number m" should be --number $\underline{m}$--;

Line 65, "repetitions m" should be --repetitions $\underline{m}$--.

<u>Column 4</u>

Line 21, "pitch d" should be --pitch $\underline{d}$--;

Line 22, "repetitions m" should be --repetitions $\underline{m}$--;

Line 24, "Joint" should be --joint--;

Line 55, "product f" should be --product $\underline{f}$--;

Line 64, "product f" should be --product $\underline{f}$--.

<u>Column 5</u>

Line 7, "pitch d," should be --pitch $\underline{d}$,--;

Line 8, "product f" should be --product $\underline{f}$--;

UNITED STATES PATENT AND TRADEMARK OFFICE
CERTIFICATE OF CORRECTION

PATENT NO. : 5,600,759
DATED : February 4, 1997
INVENTOR(S) : Tatsuo KARAKAMA

It is certified that error appears in the above-indentified patent and that said Letters Patent is hereby corrected as shown below:

Column 5

Line 16, "index i" should be --index $\underline{i}$--;

Line 17, "index i" should be --index $\underline{i}$--;

Line 19, "i by" should be --$\underline{i}$ by--;

Line 24, "P1" should be --Pi--;

Line 58, "index i" should be --index $\underline{i}$--.

Column 6

Line 40, "m(=m-1) should be --$\underline{m}$(=m-1)--;

Line 42, "times m" should be --times $\underline{m}$--;

Line 46, "index i" should be --index $\underline{i}$--;

Line 50, "times m," should be --times $\underline{m}$,--;

Line 67, "pitch d)" should be --pitch $\underline{d}$)--.

UNITED STATES PATENT AND TRADEMARK OFFICE
CERTIFICATE OF CORRECTION

PATENT NO.   :   5,600,759
DATED        :   February 4, 1997
INVENTOR(S)  :   Tatsuo KARAKAMA It is certified that error appears in the above-indentified patent and that said Letters Patent is hereby corrected as shown below:

<u>Column 10</u>

Line 22, "wherein the step (i)" should be --wherein the step (h)--.

Signed and Sealed this

First Day of July, 1997

Attest:

BRUCE LEHMAN

*Attesting Officer*     *Commissioner of Patents and Trademarks*